J. G. PERRY.
Meat Cutter.
No. 24,953.  Patented Aug. 2, 1859.
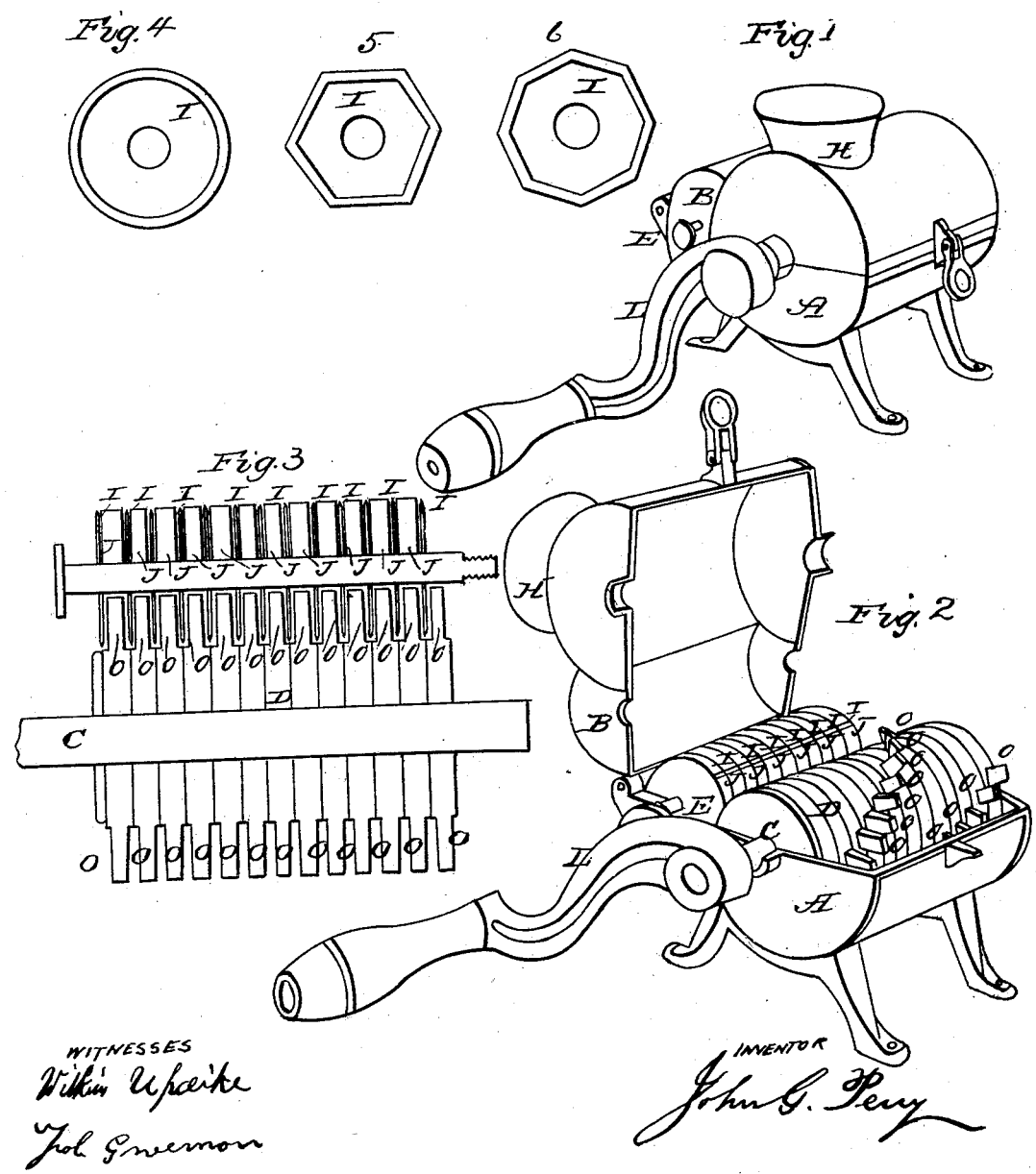

UNITED STATES PATENT OFFICE.

JOHN G. PERRY, OF KINGSTON, RHODE ISLAND.

IMPROVED MEAT-CUTTER.

Specification forming part of Letters Patent No. 24,953, dated August 2, 1859.

*To all whom it may concern:*

Be it known that I, JOHN G. PERRY, of Kingston, in the county of Washington, in the State of Rhode Island, have invented a new and useful Improvement in Machines for Cutting Meat; and I do hereby declare that the following is a full and correct description thereof, reference being had to the accompanying drawings, and to the letters of reference marked thereon, similar letters denoting the same parts in all the figures.

In the drawings, Figure 1 is a perspective view of the machine. Fig. 2 is a view of the machine open to show the arrangement of the knives, &c. Fig. 3 shows a section of the knives and cylinder, taken through the centers of their shafts. Figs. 4, 5, and 6 represent knives of different shapes.

To construct my improved meat-cutter, I make the hollow case A divided horizontally and lengthwise through its center and having on one side the semi-cylindrical projection B parallel with and open into it on the inside. This case A is made with bearings at its ends to receive the shaft C of the cylinder D. The projection or chamber B has also holes made in its ends to receive the rod E, that holds the knives in place. The cylinder D may be made either of one piece, with the studs $o\ o\ o$ projecting from its surface, or it may be made of separate stud-plates on a shaft.

The improvement in this machine is mainly upon the knives and the parts immediately connected with them. These knives are made with holes in their centers, through which is put the rod E to hold them and allow them to turn around on or with it as the meat is pressed against them by the studs, or by connecting the rod E with the cylinder-shaft by gears or otherwise, making a rolling and drawing cut that will divide the meat easily and thoroughly. The knives may be made round or with more or less sides. (See Figs. 4, 5, and 6.) As will be readily perceived, these knives present a cutting-edge to the meat whichever way the cylinder D may be turned, so that if the meat should be stringy and tend to clog the machine by winding around the cylinder by simply reversing the motion of the crank it will be relieved. Between the knives upon the rod E are put space-blocks J J to keep the knives at a proper distance apart, so as to allow the studs $o\ o\ o$ to pass between them. It is not necessary that the chamber B should be placed at one side of the case, but it may be put at either side or below it, as may be found most convenient.

By removing the rod E the knives and space-blocks may be readily taken out for the purpose of sharpening or washing.

In operating the machine it is simply necessary to secure it to the bench or table by the feet, and then, putting the meat into the hopper H, turn the crank L and the meat as fast as it is cut will be discharged at the outlet at the opposite end. D, instead of being a cylinder, may be made with more or less sides with studs.

Having described my machine, I claim as my invention and desire to secure by Letters Patent—

Combining the revolving knives with a cylinder or block having studs upon its surface, substantially as herein set forth.

JOHN G. PERRY.

Witnesses:
WILKINS UPDIKE,
R. P. GARDNER.